April 15, 1952     L. U. EYERLY     2,592,879
SAFETY DEVICE FOR AMUSEMENT RIDES
Filed Feb. 4, 1949     3 Sheets-Sheet 1
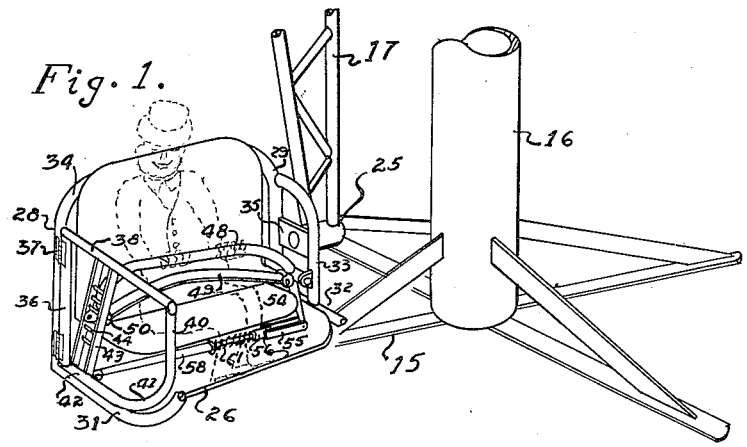
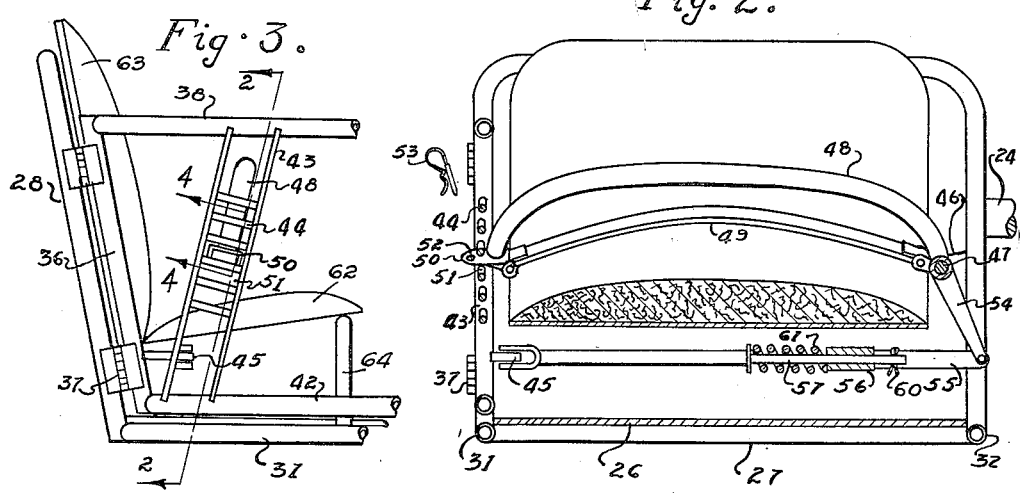
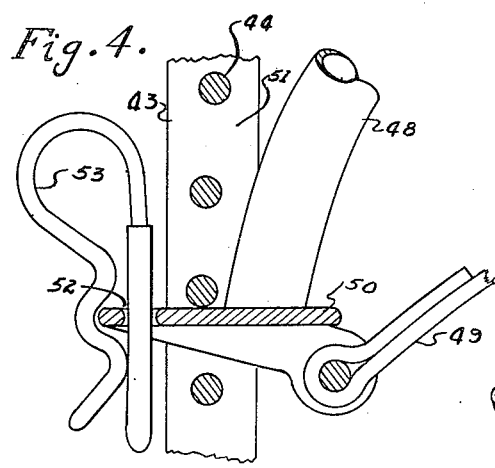
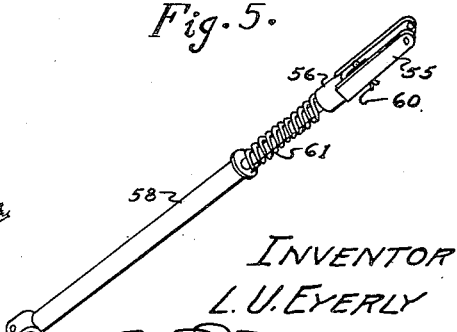
INVENTOR
L. U. EYERLY
ATTORNEY April 15, 1952     L. U. EYERLY     2,592,879
SAFETY DEVICE FOR AMUSEMENT RIDES
Filed Feb. 4, 1949     3 Sheets-Sheet 2
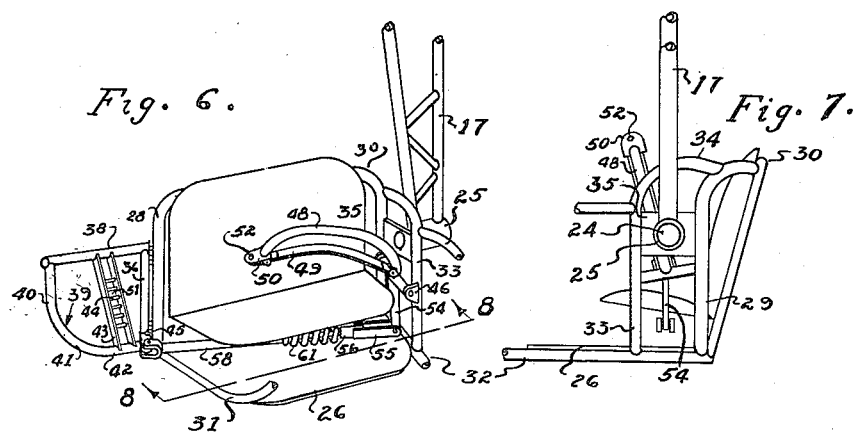
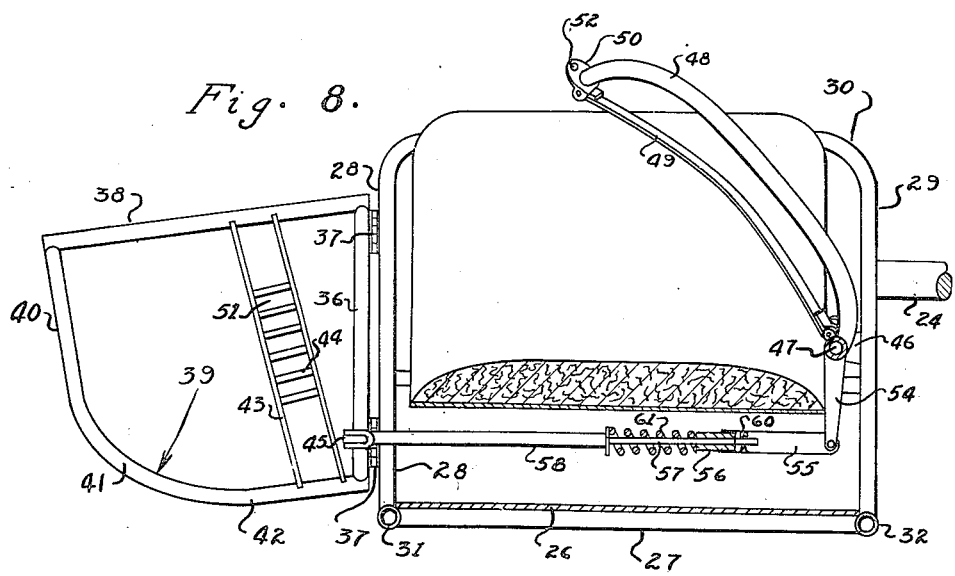
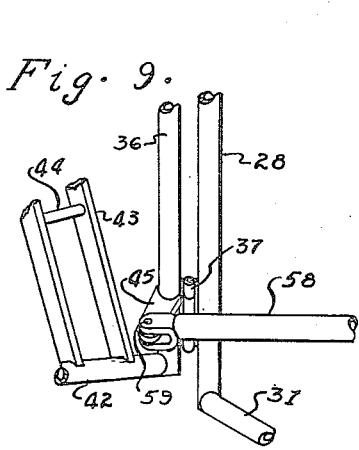
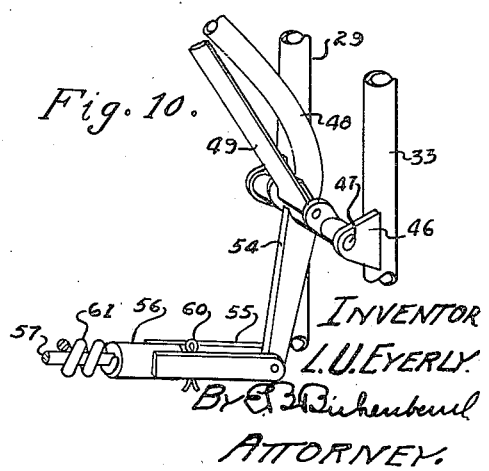

Patented Apr. 15, 1952

2,592,879

UNITED STATES PATENT OFFICE 2,592,879

SAFETY DEVICE FOR AMUSEMENT RIDES

Lee U. Eyerly, Salem, Oreg.

Application February 4, 1949, Serial No. 74,537

6 Claims. (Cl. 155—189)

1

This invention relates generally to amusement devices and particularly to a safety device for amusement rides.

The main object of this invention is to produce a safety device to lock the passengers in their seats with the maximum degree of safety and at the same time reduce the time required for loading and unloading passengers, thereby greatly increasing the number of rides which may be given in a given period of time.

The second object is to so construct the device that its operation is entirely automatic and self-adjustable to the sizes of the passengers.

The third object is to so construct the device that there is no way in which it can be rendered inoperative by careless or intentional action on the part of the passenger or attendant, as long as the door of the cage is closed.

I accomplish these and other objects in the manner set forth in the following specification as illustrated in the accompanying drawings, in which:

Fig. 1 is a fragmentary perspective view in which a passenger is shown on a seat and being held by the safety strap and showing the cage removed.

Fig. 2 is a section taken along the line 2—2 in Fig. 3.

Fig. 3 is a fragmentary side elevation of Fig. 2.

Fig. 4 is an enlarged fragmentary section taken along the line 4—4 in Fig. 3 showing the safety pin on the lock.

Fig. 5 is a perspective view of actuating bar.

Fig. 6 is a perspective view similar to Fig. 1 but showing the door open and the strap in a released position.

Fig. 7 is an end elevation of a car from the supporting end.

Fig. 8 is a view similar to Fig. 2 but showing the door open and the strap released.

Fig. 9 is a fragmentary perspective view of the door hinge and its connection to the operating bar.

Fig. 10 is a fragmentary view of the hinge for the strap arm.

Like numbers of reference refer to the same or similar parts throughout the several views.

Figure 11:
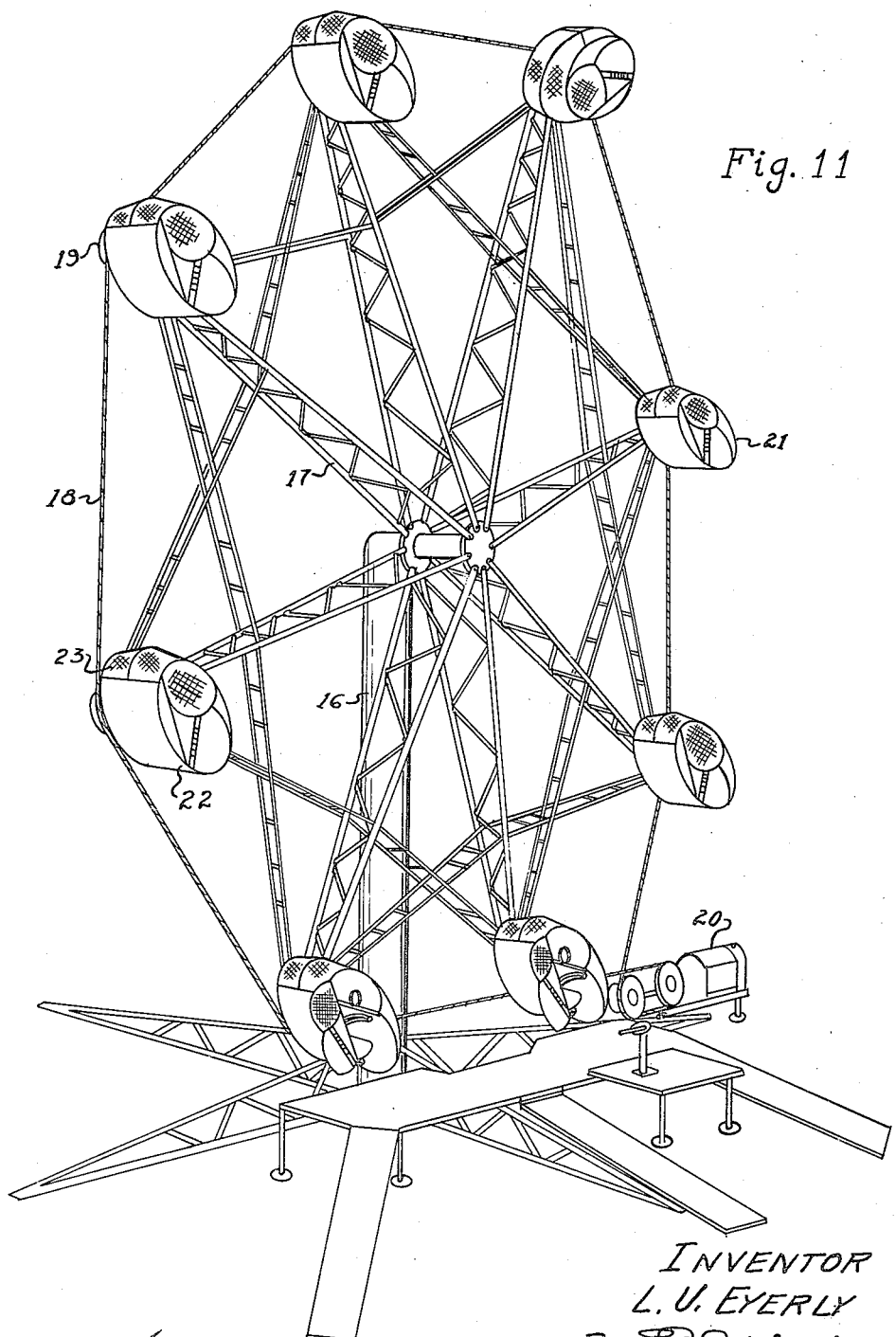
Fig. 11 is a perspective view showing a complete ride.

Referring in detail to the drawings, there is shown a base 15 upon which is erected a rigid mast 16 upon which is mounted a wheel whose spokes 17 are revolvable in a vertical plane by means of the cables 18 which pass around the shoes 19 on the outer ends of the spokes 17.

2

Power is supplied to the cable 18 from the motor 20 under the control of an attendant.

At the outer ends of the spokes 17 are mounted the cages 21 which are somewhat oval but which may assume any desired shape. The lower portion 22 is usually made of sheet metal or fabric and the upper portion 23 of wire cloth or transparent plastic.

Each cage 21 is revolvably mounted on a horizontal stub shaft 24 which journals in the bearing 25 on the outer end of the spokes 17. The frame work of each cage 21 includes a floor 26 which is supported transversely by the tubular beam 27 at whose ends are mounted the upright posts 28 and 29 which are joined by the back bar 30. Side frames 31 and 32 extend forwardly from the posts 28 and 29 and serve to support the cage 21. A post 33 extends upwardly from the frame 32 parallel with the post 29 and joined thereto by the curved hand rail 34.

The posts 33 and 29 are also joined by a horizontal plate 35 to which the stub shaft 24 is secured. To the post 28 is attached the door frame side 36 by means of the hinges 37.

The rail 38 of the door 39 is straight and its front side 40 is joined by a curved portion 41 to the lower side 42 which is integral with the side 36. Between the top rail 38 and lower side 42 are secured a pair of parallel rails 43 having latching bars 44 secured between them.

The door frame side 36 has also formed thereon a lever 45 which is fixed with relation to the door 39.

The upright posts 29 and 33 have projecting therefrom the lugs 46 which support the horizontal rock shaft 47 to which is hinged a bowed strap arm 48, between whose ends is secured the flexible strap 49 of canvas or other suitable material. On the swinging end of the arm 48 is mounted a protruding latch point 50 capable of passing through any of the openings 51 in the ladder-like structure formed by the parts 43 and 44. The point 50 is provided with a hole 52 for a safety pin 53 which may be in any desired form to prevent unauthorized opening of the door 39.

The shaft 47 has projecting therefrom a lever 54, to which are attached the straps 55 of a sleeve 56, through which slidably extends the rod 57 which extends from the end of the tubular connecting rod 58 which is connected to the lever 45 by the pin 59. A cotter key 60 passes through the rod 57 between the straps 55.

On the rod 57 is placed a compression spring 61 between the sleeve 56 and the rod 58.

Rides of this type are commonly equipped with brakes which make it possible for the rider to rock and even completely overturn the cage. (See my co-pending application, Serial No. 23,171, filed April 26, 1948, and now abandoned.) A seat 62 and seat back 63 are mounted within the structure being supported by the back bar 30 and on the seat supporting legs 64 which are supported by the side frames 31 and 32.

The operation of the device is as follows: Upon the closing of the door 39, the strap arm 48 and its strap 49 are forced down under the compression of the spring 61 causing the strap 49 to rest firmly across the lap of the rider. When the door 39 approaches its closed position, the latch point 50 will enter the opening 51 with which it happens to register so that the final closing of the door causes the arm 48 to be held down positively until the door 39 is again opened.

It can be seen that by this construction the strap 49 is automatically adjusted to the size of the person and the firmness of the application is increased with the size of the person.

In most cases a keeper of some sort, such as the pin 53 or its equivalent, should be employed to prevent any careless or intentional release of the strap 49 during the ride.

It can be seen that this device not only makes the ride completely safe but it also greatly increases the earning capacity of the ride.

Since the total riding time seldom exceeds one minute, it can be seen that the loss of a few seconds in loading and unloading each cage can easily total the riding time and due to the automatic action, my ride is able to show as much as a 50 per cent increase in revenue on certain types of ride.

I claim:

1. In a safety device for cars used in amusement rides, the combination of a frame, a seat supported by said frame, a door hinged to said frame at one end of said seat, an arm hinged to said frame over said seat opposite said door, means for actuating said arm from said door, a plurality of latching bars in the plane of said arm and secured to said door holding said arm downwardly when said door is closed and a latch for said arm operable from the exterior of the car.

2. In a safety device for amusement rides, the combination of a rockable frame, a seat secured to said frame, a door hinged to said frame forming a closure at one end of said seat, an arm hinged to said frame at the opposite end of said seat movable in a plane passing downwardly along the length of said seat with its swinging end engaging said door when said door is closed, yieldable linkage between said door and arm whereby said arm will be depressed when said door is closed, and a latch for holding said arm in a fixed relation to said door.

3. In a safety device for amusement rides, the combination of a swing frame, a seat mounted in said frame, a door hinged to said frame at one end of said seat, said door having a series of latch openings therein, a hold down arm hinged on a substantially horizontal axis to said frame opposite said door having its swinging end in the path of said latch openings, levers projecting from said door and pivoted arm end, a yieldable link joining the ends of said levers and a lock for holding the arm end within a latch opening and to prevent the opening of said door.

4. In a safety device for amusement rides, the combination of a swing frame, a seat supported by said frame, a hold down arm hinged at one end to said frame and adapted to extend across said seat on the lap of the occupant thereof, a door hinged to said frame at one end of said seat, having a plurality of latching recesses formed therein, any one of which can receive the movable end of said arm, levers projecting from the door and from the pivoted end of said arm, a telescopic link joining said levers and a spring in said lever urging same to its maximum length.

5. In a safety device for amusement rides, the combination of a swing frame, a seat supported by said frame, a bow-shaped hold down arm hinged to said frame at one end of said seat, a strap stretched between the ends of said arm, a door hinged to said frame opposite the hinged end of said arm, a compressible telescopic link between said door and arm having a spring urging said link to its maximum length, and means for locking said arm to said door when said arm is in a hold down position and said door is in a closed position.

6. In a safety device for amusement rides, the combination of a swing frame, a seat supported by said frame, a door hinged at one end of said seat, said door having a series of latching bars mounted thereon, a hold down bar having one end hinged to said frame at the end of said seat remote from said door, one end of said bar extending between a pair of said latching bars, when said door is in a closed position and said bar is in a hold down position, a lock for holding said door to said arm, and a yieldable link between said door and arm having its ends joined to said door and arm.

LEE U. EYERLY.

REFERENCES CITED

The following references are of record in the file of this patent:

UNITED STATES PATENTS

| Number | Name | Date |
|---|---|---|
| 199,545 | Hickey | Jan. 22, 1878 |
| 1,354,436 | Hermann | Jan. 13, 1920 |
| 1,440,586 | Feucht | Jan. 2, 1923 |
| 2,165,698 | Eyerly | July 11, 1939 |
| 2,203,971 | Shepherd | June 11, 1940 |
| 2,244,650 | Curran et al. | June 3, 1941 |
| 2,346,871 | Provenzano | Apr. 18, 1944 |